(12) United States Patent
Arza

(10) Patent No.: US 10,898,776 B1
(45) Date of Patent: Jan. 26, 2021

(54) FOOTBALL TRAINING DEVICE

(71) Applicant: Edward Arza, Tallahassee, FL (US)

(72) Inventor: Edward Arza, Tallahassee, FL (US)

(*) Notice: Subject to any disclaimer, the term of this patent is extended or adjusted under 35 U.S.C. 154(b) by 0 days.

(21) Appl. No.: 16/937,706

(22) Filed: Jul. 24, 2020

Related U.S. Application Data

(63) Continuation-in-part of application No. 14/274,157, filed on May 9, 2014, now Pat. No. 10,744,387.

(51) Int. Cl.
*A63B 69/00* (2006.01)
*A63B 71/06* (2006.01)
*A63B 21/00* (2006.01)

(52) U.S. Cl.
CPC ........ *A63B 69/002* (2013.01); *A63B 21/4007* (2015.10); *A63B 69/0059* (2013.01); *A63B 71/0622* (2013.01); *A63B 2071/0627* (2013.01); *A63B 2071/0655* (2013.01); *A63B 2243/007* (2013.01)

(58) Field of Classification Search
CPC .............. A63B 69/002; A63B 21/4007; A63B 69/0059; A63B 71/0622; A63B 2071/0627; A63B 2071/0655; A63B 2243/007
USPC ....................................................... 473/438
See application file for complete search history.

(56) References Cited

U.S. PATENT DOCUMENTS

| 5,324,038 A | 6/1994 | Sasser | |
|---|---|---|---|
| 8,740,730 B1* | 6/2014 | Przyborowski | A63B 69/0059 473/438 |
| 8,986,139 B1* | 3/2015 | Gideon | A63B 69/3608 473/438 |
| 2008/0026351 A1* | 1/2008 | Thompson | G09B 19/0038 434/251 |
| 2010/0323824 A1* | 12/2010 | Gamboa | A63B 69/0059 473/438 |

* cited by examiner

Primary Examiner — John E Simms, Jr.
Assistant Examiner — Rayshun K Peng
(74) Attorney, Agent, or Firm — Luedeka Neely Group, PC

(57) ABSTRACT

A football training device including a vest having a breast plate. A deformable corrective member having an elongate tubular-shaped shape, a proximal end and a distal end, is attached to breast plate and extends outwardly substantially perpendicular to the breast plate of the vest. The tubular-shaped member is positioned on the breast plate on a side of the breast plate that relates to the throwing hand of a user and is positioned at a height on the breast plate that alerts a user of a low football takeaway from a neutral position to a loaded football ball position. A restraining device is removably attached to the vest. The restraining device is positioned on a side of the vest that relates to the non-throwing hand of the user to urge the non-throwing hand of the user to remain close to the breast plate during a throwing motion of the throwing hand.

20 Claims, 20 Drawing Sheets

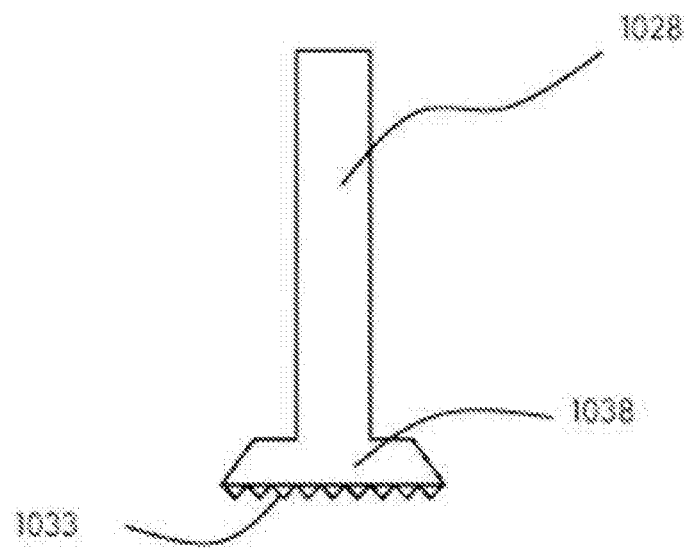
FIG. 15
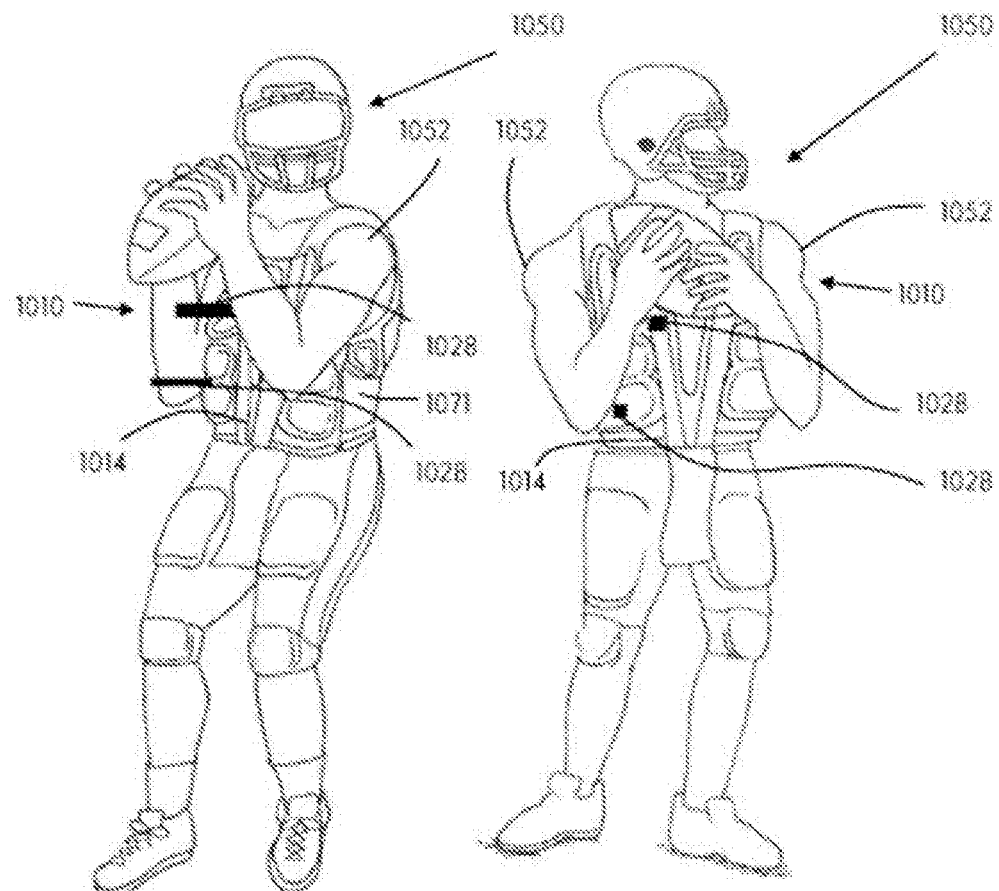
FIG. 16 FIG. 17

FOOTBALL TRAINING DEVICE

RELATED APPLICATION

This application is a continuation in part of application Ser. No. 14/274,157, filed May 9, 2014, now allowed.

TECHNICAL FIELD

The present invention relates to a football training device, and more in particularly to a football training device for teaching a user the proper football throwing mechanics to obtain optimal football ball release timing.

BACKGROUND

In order to complete a well performed football pass, a quarterback should have the optimal throwing motion, which includes body position and takeaway position. In particular, it is desirable for a quarterback to complete a pass with an erect posture and with the non-throwing hand and arm remaining close to the chest. It is further desirable for the quarterback to transition the ball from a neutral position to a loaded position with the tip of the ball raised above the quarterback's elbow because lowering of the football during the takeaway is a common cause of fumbles and a slow football release.

However, there exists no known device with a corrective member configured to prevent the downward takeaway of the football to the loaded position and to train a user to maintain the non-throwing hand and arm close to the chest.

SUMMARY

The present invention advantageously provides a football training device for teaching a user the proper throwing mechanics to obtain optimal football ball release timing, as well as the correct takeaway motion of a quarterback or any other person.

According to an embodiment of the disclosure, a principal object is to provide a vest worn by a user for improving a quarterback's throwing mechanics, including increasing the release time of the football leaving the quarterback's hand and eliminating unnecessary movements that slow down the release time of the ball being thrown and leaving the quarterbacks hand.

According to an embodiment of the disclosure, another object is to alert a quarterback and/or the quarterback's coach when the quarterback contacts a corrective member, the corrective member positioned to be contacted when the quarterback lowers the ball during the transition to a loaded football position. The loaded football position allows the quarterback to uncoil and deliver a football pass.

According to an embodiment of the disclosure, another object is to provide a football training device comprising a wearable member forming a front portion and a back portion and one or more corrective members affixed to the wearable member.

In an embodiment, the corrective member extends outwardly from the front portion.

In yet another embodiment, the corrective member is releasably affixed to the wearable member.

In yet a further embodiment, the corrective member releases from the wearable member from a user caused contact during a throwing motion.

In an embodiment, is at least one front portion hook and loop material is integrated with front portion, a corrective member hook and loop material is integrated with a proximal end of the corrective member, and the corrective member hook and loop material is releasably affixed with the at least one front portion hook and loop material.

In a yet further embodiment, a front portion hook and loop material includes a first vertical portion and a second vertical portion, the first and second vertical portion each extending vertically along the front portion of the wearable member. The first and second vertical portions converge towards a bottom of the front portion of the wearable member. In yet another embodiment, the first and second vertical portions diverge towards a bottom of the front portion of the wearable member.

In an embodiment, at least one member is capable of providing any of a visual and/or an audial alert following a contact with the corrective member.

In yet another embodiment, a signal transmission apparatus is configured to transmit a signal to a remote device for alerting of at least one contact with the corrective member.

According to an embodiment of the disclosure, a principal object is to provide a football training device for improving the ball takeaway of a quarterback to a loaded football ball position, the football training device comprising a wearable member having a front portion and a corrective member having a proximal portion releasably affixable to the front portion. The corrective member having an outwardly extending portion.

In an embodiment, the corrective member extends outwardly at substantially a right angle to the front portion of the wearable member.

In an embodiment, the corrective member extends outwardly substantially perpendicular to the front portion.

In an embodiment, the corrective member extending outwardly from the proximal portion at least substantially parallel to a side of the wearable member.

According to an embodiment of the present invention, a principal object is to provide a football training device for improving the ball takeaway of a quarterback to a loaded football ball position, the football training device comprising a wearable member, at least one corrective member releasably affixed to the wearable member, whereby the at least one corrective member is positioned for receiving contact during a quarterback football transition having a low football takeaway to the loaded football position.

According to another embodiment, the wearable member further includes a restraining device removably attached to the vest. The restraining device is positioned on a side of the vest that relates to the non-throwing hand of the user to urge the non-throwing hand and arm of the user to remain close to the breast plate during a throwing motion of the throwing hand.

In another embodiment, the restraining device comprises a spring clip and an elastic band for the wrist of the user attached to the spring clip.

In another embodiment, the vest further comprises a pair of holes on each frontal side of the breast plate for removably attaching the spring clip to the vest.

In another embodiment, the vest further comprises a fabric loop on each frontal side of the breast plate for removably attaching the spring clip to the vest.

Other embodiments of the disclosure will become evident by reference to the attached drawings and following description.

BRIEF DESCRIPTION OF THE DRAWINGS

Embodiments of the disclosure are described herein in which similar elements are given similar reference characters, and a more complete understanding of the disclosed embodiments, and the attendant advantages and features thereof, will be more readily understood by reference to the following detailed description when considered in conjunction with the accompanying drawings wherein:

FIG. 15 is a view of an exemplary corrective member in accordance with the principles of the present embodiment;

FIG. 16 is a perspective view of the football training device of FIGS. 8-10 in use by a quarterback in accordance with the principles of the present embodiment;

FIG. 17 is an alternative perspective view of the football training device of FIGS. 8-10 in accordance with the principles of the present embodiment;

DETAILED DESCRIPTION OF THE INVENTION

Figure 1:
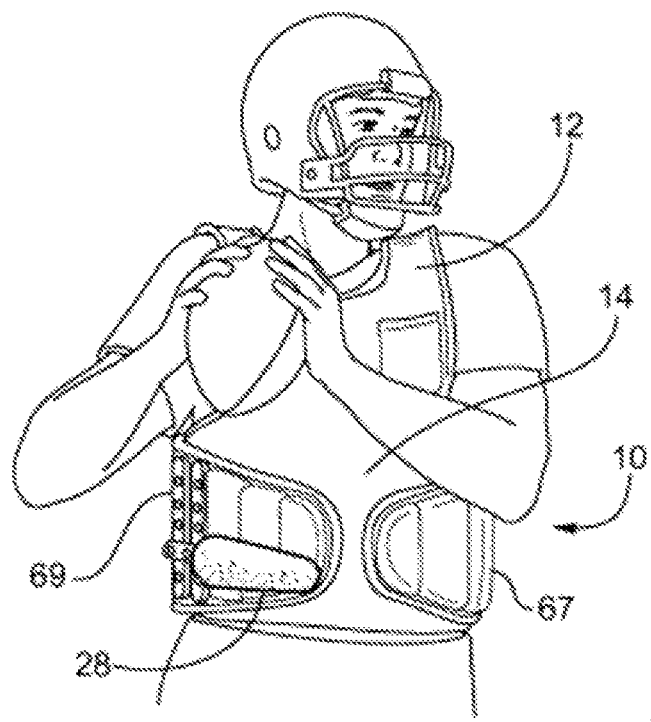
FIG. 1 is a perspective view of a football training device in accordance with the principles of the present embodiment.

The present invention advantageously provides a football training device for teaching a user the proper throwing mechanics to obtain optimal football ball release timing, as well as the correct takeaway motion of a quarterback or any other person. The disclosed embodiments contemplate various types of football training devices, including vests and shoulder pads having a member for correcting both the football takeaway to the loaded football position prior to throwing the football.

Accordingly, the system and method components have been represented where appropriate by conventional symbols in the drawings, showing only those specific details that are pertinent to understanding the embodiments of the disclosure so as not to obscure the disclosure with details that will be readily apparent to those of ordinary skill in the art having the benefit of the description herein.

Reference is now made to the drawings in which like reference designators refer to like elements. FIGS. 1-4 show an exemplary football training device constructed in accordance with the principles of the disclosed embodiments and designated generally as football training device 10. In particular, the football training device 10 may be formed having a wearable portion 12, the wearable portion 12 having a front portion 14 and a back portion 16 (constructed to form a vest. The front and back portions 14 and 16 optionally include sides 15 and 17. The front portion 14 includes a left edge 67 and a right edge 69.

Figure 2:
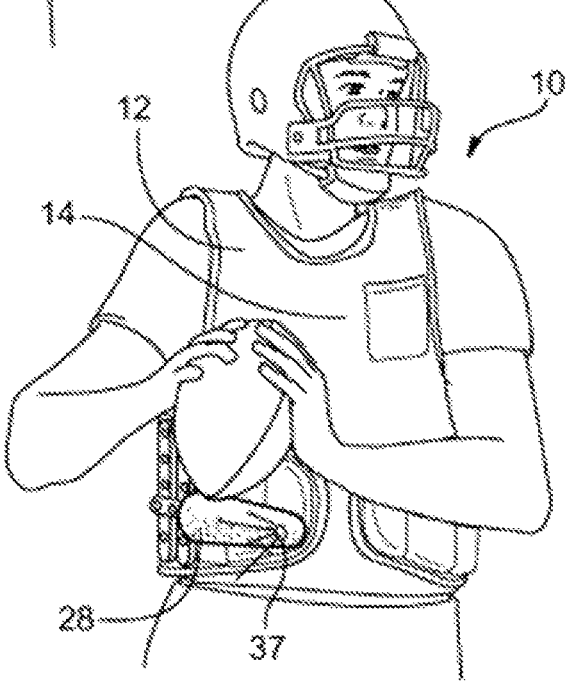
FIG. 2 is a perspective view of a football training device depicting contact with a corrective member in accordance with the principles of the present embodiment.

In the embodiments shown in FIGS. 1-2, the wearable portion 12 is worn by a quarterback. While the disclosure references use by a quarterback, a quarterback includes any person that may use the device or any user whatsoever within the spirit and scope of the disclosed embodiments.

Figure 3:
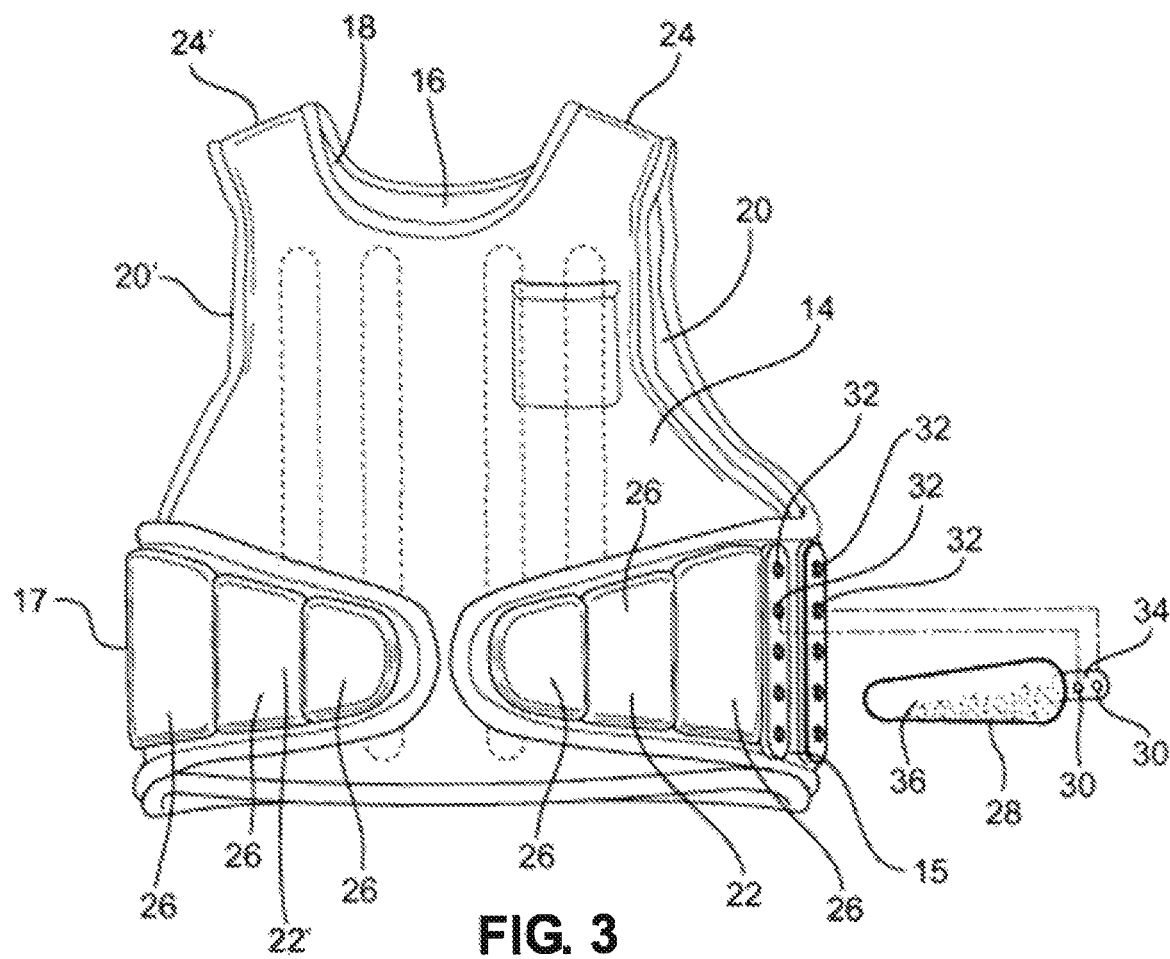
FIG. 3 is a partially exploded view of a corrective member of the football training device of FIG. 1 in accordance with the principles of the present embodiment.

Referring now to FIG. 3, the front portion 14 and the back portion 16 join to form a neck opening 18 for the quarterbacks neck to enter and mirrored left and right arm openings 20, 20'. In one embodiment, the wearable portion sits on a quarterback's shoulders for maintaining the wearable portion 12 (see FIG. 1-2). In an embodiment, the wearable portion 12 includes left and right flaps 22, 22'. The left and right flaps 22, 22' releasably secure with front portion 14 to provide an adjustable and secure fit of the vest with the quarterback. In an embodiment, the left and right flaps 22, 22' secure to the front portion 14 by way of intervening hook and loop material (not shown). While hook and loop material is disclosed, alternative securement members may be implemented within departing from the spirit and scope of the present embodiment.

Figure 10:
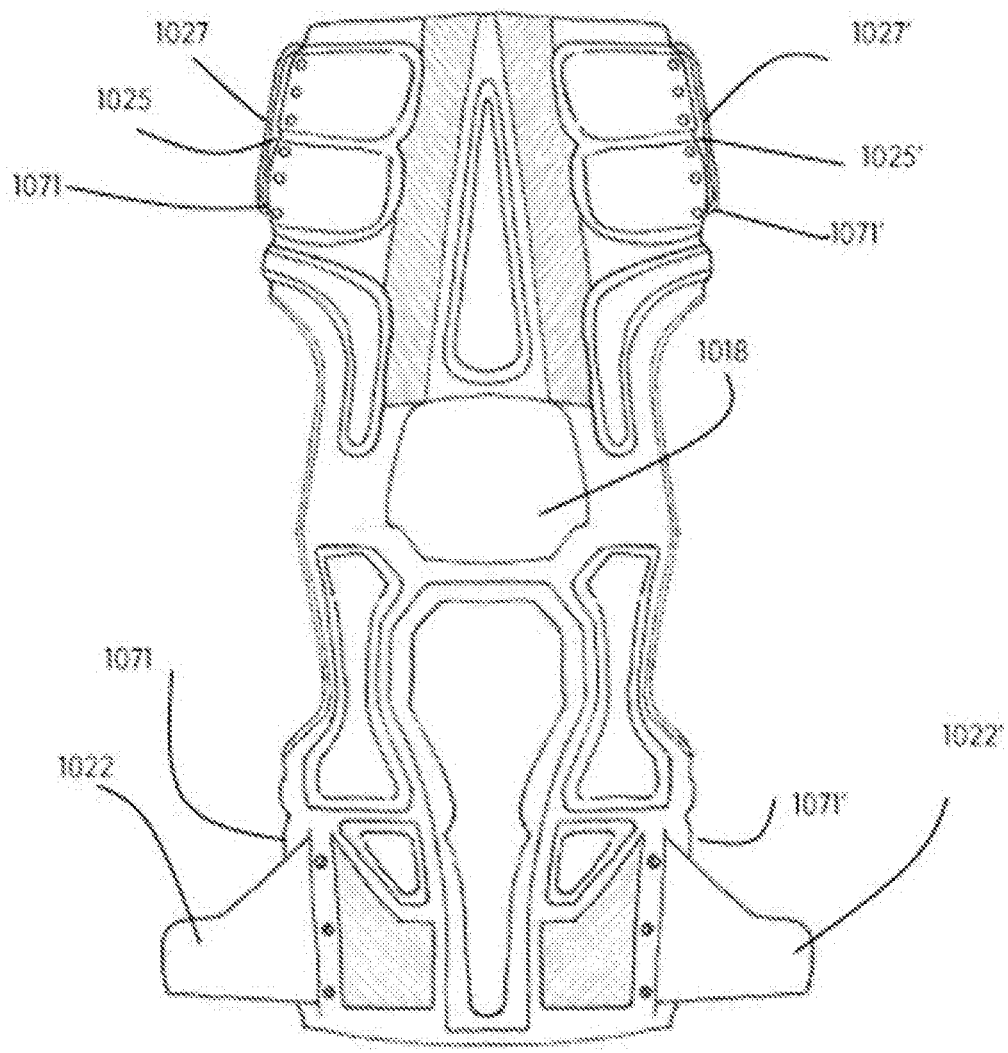
FIG. 10 is an embodiment of the football training device of FIGS. 8 & 9 in an open state in accordance with the principles of the present invention.
Figure 11:
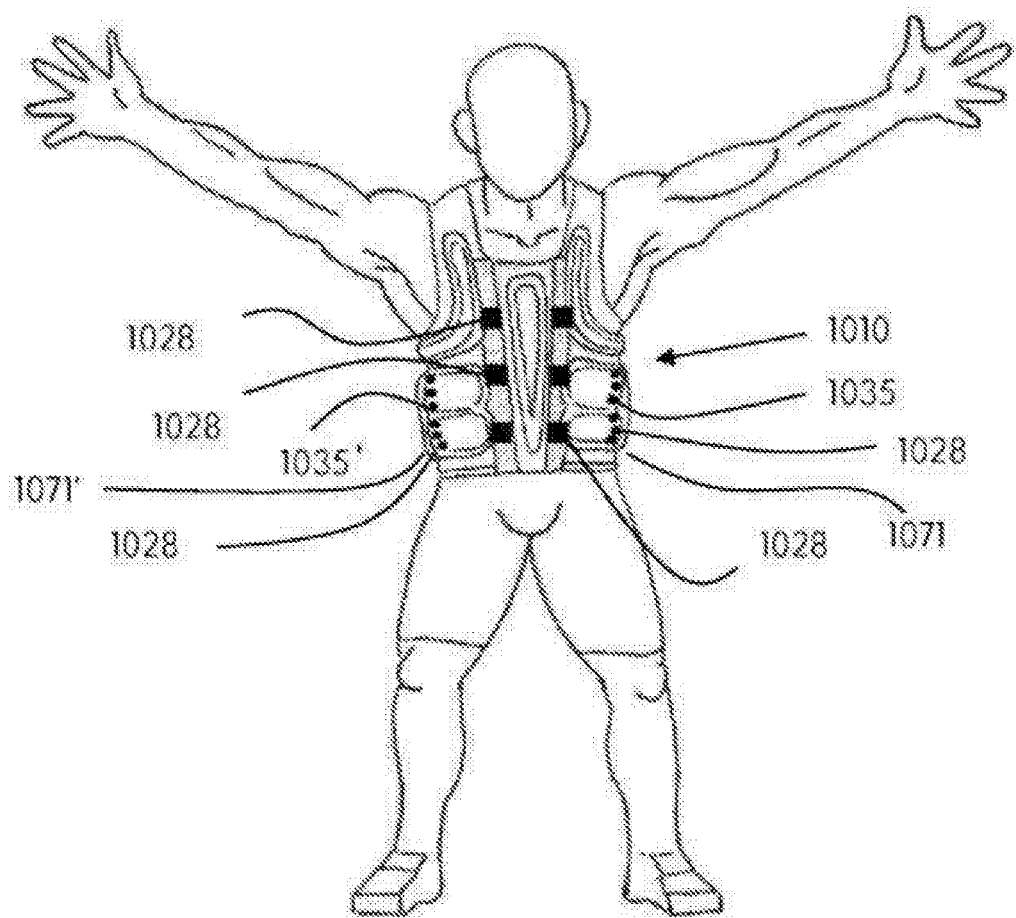
FIG. 11 is a front view of the football training device of FIGS. 8-10 being worn by a quarterback in accordance with the principles of the present embodiment.
Figure 12:
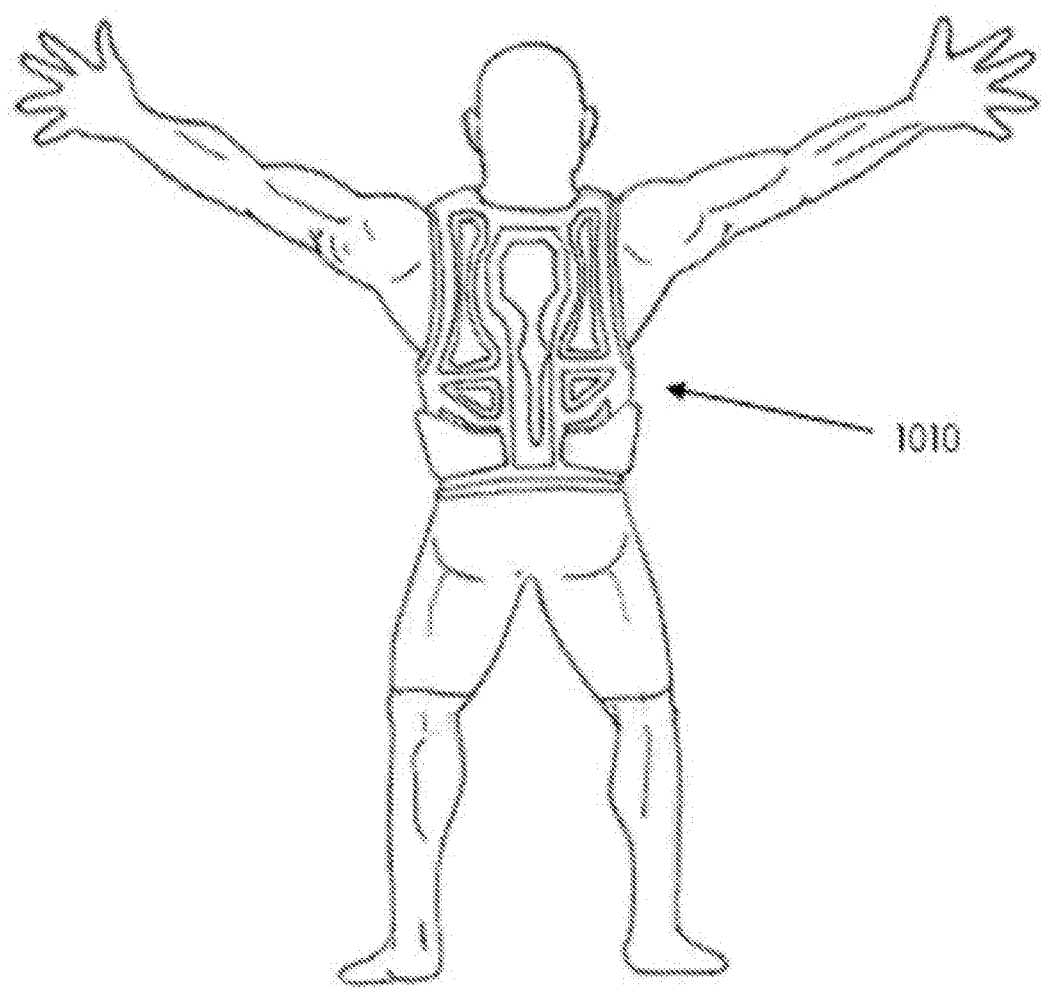
FIG. 12 is a rear view of the football training device of FIGS. 8-10 being worn by a quarterback in accordance with the principles of the present embodiment.
Figure 13:
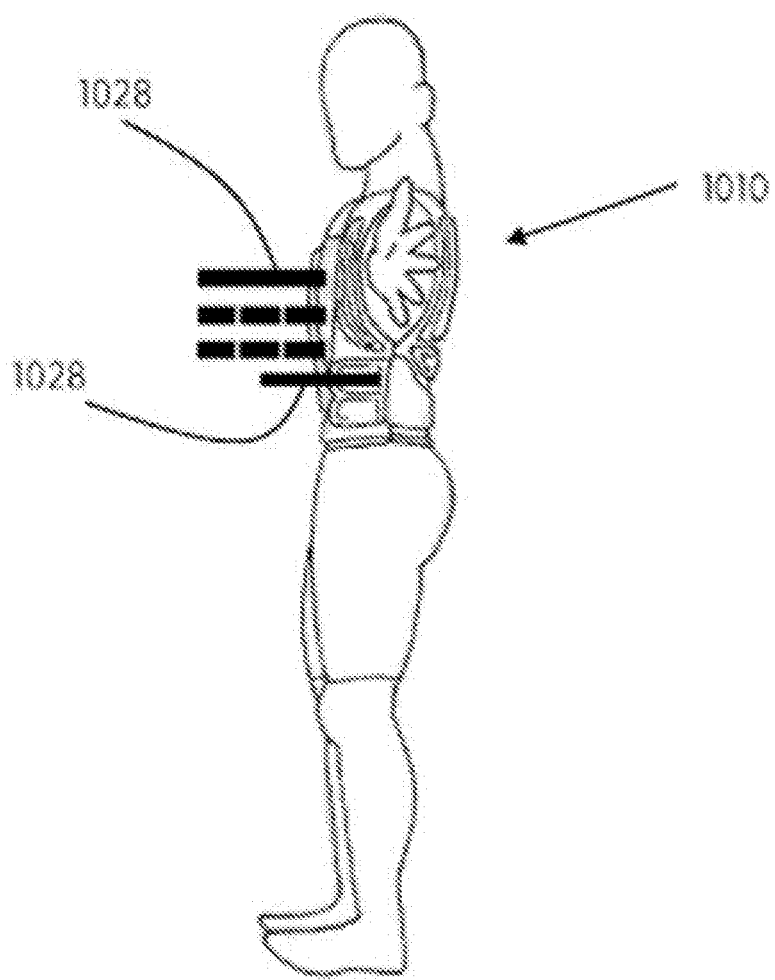
FIG. 13 is a left side view of the football training device of FIGS. 8-10 being worn by a quarterback in accordance with the principles of the present embodiment.
Figure 14:
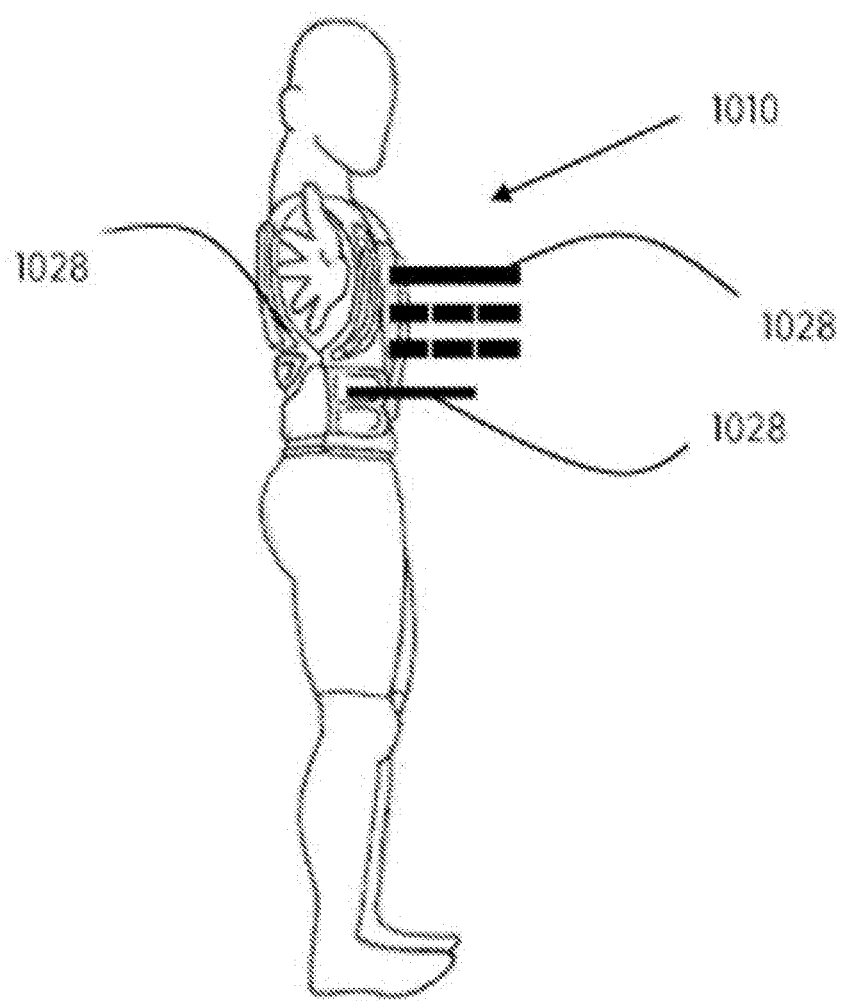
FIG. 14 is a right side view of the football training device of FIGS. 8-10 being worn by a quarterback in accordance with the principles of the present embodiment

In an embodiment, when the left and/or right flap 22, 22' release from the front portion 14, the front portion 14 and the back portion 16 may be joined only at or near a left and right shoulder seam 24, 24' (similar to the embodiment of FIG. 10).

The inside (not shown) of the left and right flap 22, 22' optionally include pockets for supporting one or more weighted members 26 for providing resistance to a quarterback. The weights may be composed of any suitable material, such as steel pellets, metal grains or sands, or the like. While the weights of the instant embodiment are disclosed as integrating with the left and right flaps 22, 22', it is not so required; instead, weights may be integrated with the football training device 10 at any desired location of the wearable portion 12.

The football training device 10 includes a corrective member 28. In an embodiment, the corrective member 28 is removably attached or otherwise affixed, either directly or indirectly, to the wearable portion 12.

In the embodiment shown in FIGS. 1-4, the corrective member 28 formed of an elongated portion 34. The elongated portion 34 may be completely or partially surrounded by soft material, such as foam or other like materials. In one embodiment, the corrective member 28 secures along the side of the football training device 10 extending outwardly in substantially the z direction as related to the front portion 14.

In an embodiment, the corrective member extends outwardly from the front portion 14 and extends substantially between the left and right edges 67, 69.

In one operational embodiment, the outward extension of the corrective member 28 correlates to the quarterback such that the corrective member 28 extends in front of the quarterback/football training device thereof, and not out towards the side of the quarterback/football training device.

Still referring to FIGS. 1-4, a securement assembly 31 is shown. In one embodiment, the securement assembly 31 includes the reciprocating press snap buttons. While securement assembly 31 is shown having press snap buttons, hook and loop material, screws and/or bolts, or other like securement members may be substituted within the spirit and scope of the instant embodiment Still referring to the embodiment shown in FIGS. 1-4, the corrective member 28 has one or more press snap buttons 30. The one or more press snap buttons secure to the wearable portion 12 via reciprocating press snap button receiving portions 32. While the instant embodiment depicts press snap buttons, other securement members for releasably securing corrective member 28 to the wearable portion 12 are contemplated and within the spirit and scope of the present invention.

In an embodiment, the elongated portion 34 is bendable allowing for deformation when contact to the corrective member is caused by a throwing arm of the quarterback. The elongated portion 34 is configured to resume its original shape when force caused to be received by the quarterback's arm is removed therefrom.

Still referring to the embodiment shown in FIGS. 1-4, the corrective member 28 is affixed at a proximal end 38 to the wearable portion 12 and extends outwardly from the wearable portion 12 and in relation to the front of quarterback's torso. In operation, the corrective member 28 extends outwardly from the front portion 14. The corrective member 28 is configured to receive contact from the arm of the quarterback when the quarterback transitions from a ball neutral position as shown in FIG. 1 to a ball loaded position as shown in FIG. 2.

Figure 4:
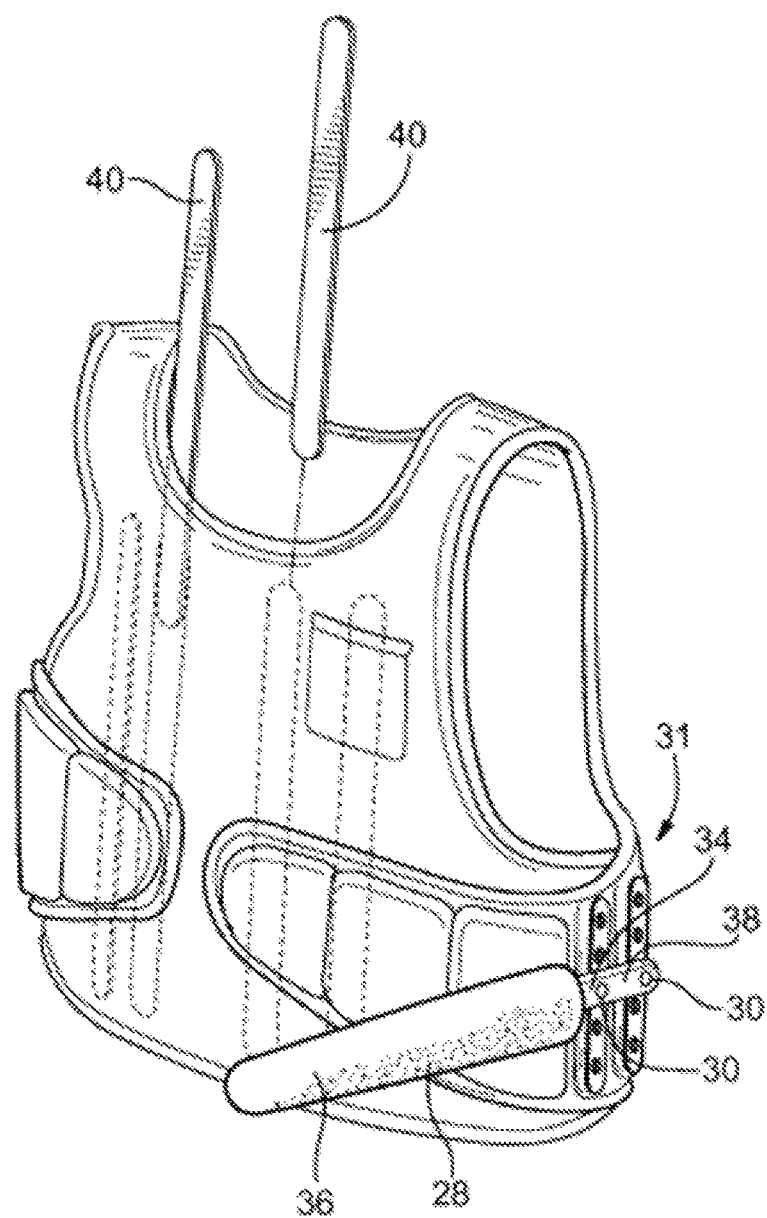
FIG. 4 is an embodiment of a football training device having an exploded view of a corrective posture member in accordance with the principles of the present embodiment.

Referring now to FIG. 4, posture corrective members 40 are shown. The elongated posture corrective members 40 are secured with the football training device 10 for maintaining and/or correcting the posture of a quarterback.

In an embodiment, the football training device 10 may include one or more audial or visual alert members 37 (FIG. 2) coupled thereof for alerting to arm contact with the corrective member 28, including without limitation contact caused by the quarterback's arm or hand. The audial or visual alert members 37 may include emitting light and/or sound from the football training device to alert the quarterback and/or the quarterback's coach to contact with the corrective member 28.

Figure 5:
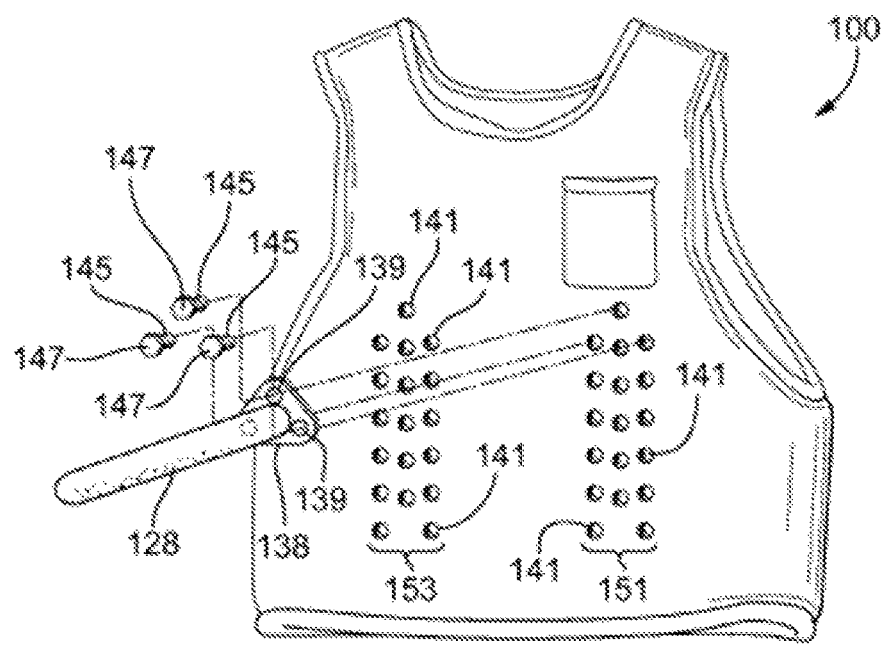
FIG. 5 is an embodiment of a football training device having a corrective member releasably securable to the device thereof in accordance with the principles of the present embodiment.

Referring now to the embodiment shown in FIG. 5, a vest 100 having a plurality of threaded apertures 141 and a corrective member 128 having a proximal end 138 are illustrated. The proximal end 138 has a plurality of apertures 139, which may or may not be threaded. A plurality of securement members having head 147 and a threaded portion 145 may be received into the plurality of apertures 139, 141, for securing the corrective member 128 to the vest 100. The vest 100 has a plurality of apertures for selectively choosing and/or adjusting the level of the corrective member 128 on the breast portion of the vest. The vest 100 has a set of left apertures 151 for a left handed quarterback and a set of right apertures 153 for a right handed quarterback.

Figure 6:
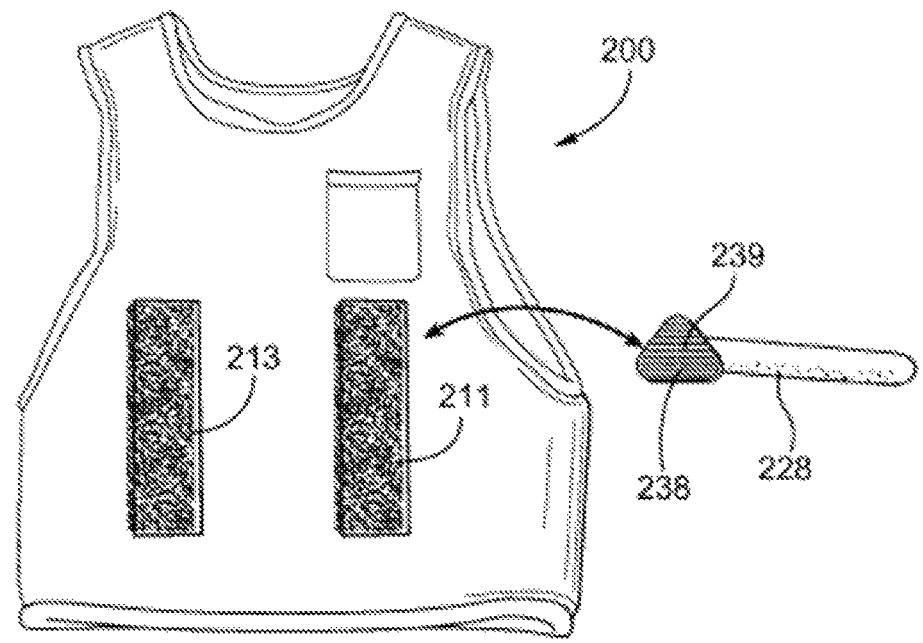
FIG. 6 is an embodiment of a football training device having a corrective member releasably securable to the device via hook and loop material in accordance with the principles of the present embodiment.

Referring now to the embodiment shown in FIG. 6, a vest 200 has a first hook and loop material 211 and a second hook and loop material 213, configured for use for either of a left handed quarterback or a right handed quarterback. Each of the first and second hook and loop material 211, 213 extend vertically along the breast portion of the vest 200. A corrective member 228 having a proximal end 238 containing hook and loop material 239 reciprocates with the hook and loop material 211, 213 of the vest 200.

In an embodiment, a signal transmission apparatus (not shown) is coupled with the football training device to transmit a signal from the signal transmission apparatus to a remote device, such as a smart phone, tablet, or other electronic device, for alerting of at least one contact with the corrective member. A mobile application, or other software, may be included and stored in computer readable memory, for viewing and statistically analyzing a plurality of quarterback throws over a period of time.

In embodiments shown in FIG. 5-6, the wearable portion does not include left and right flaps 22, 22', and instead is slipped over the arms and neck of a quarterback, similar to a typical clothing. The front portion and the back portion are joined along a side seam (not shown), as commonly understood in the art.

Figure 7:
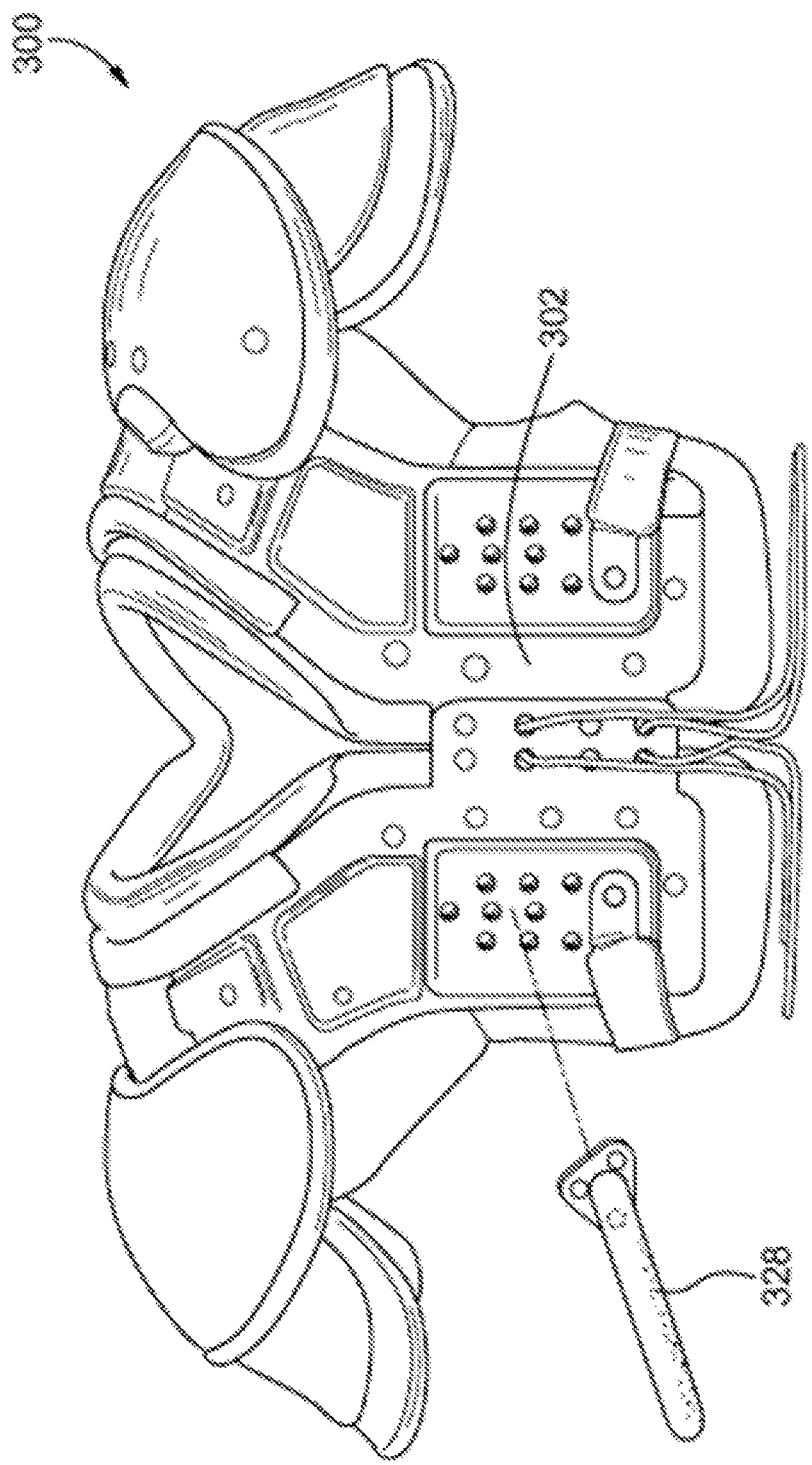
FIG. 7 is an embodiment having a corrective member attached to football shoulder pads in accordance with the principles of the present embodiment.
Figure 8:
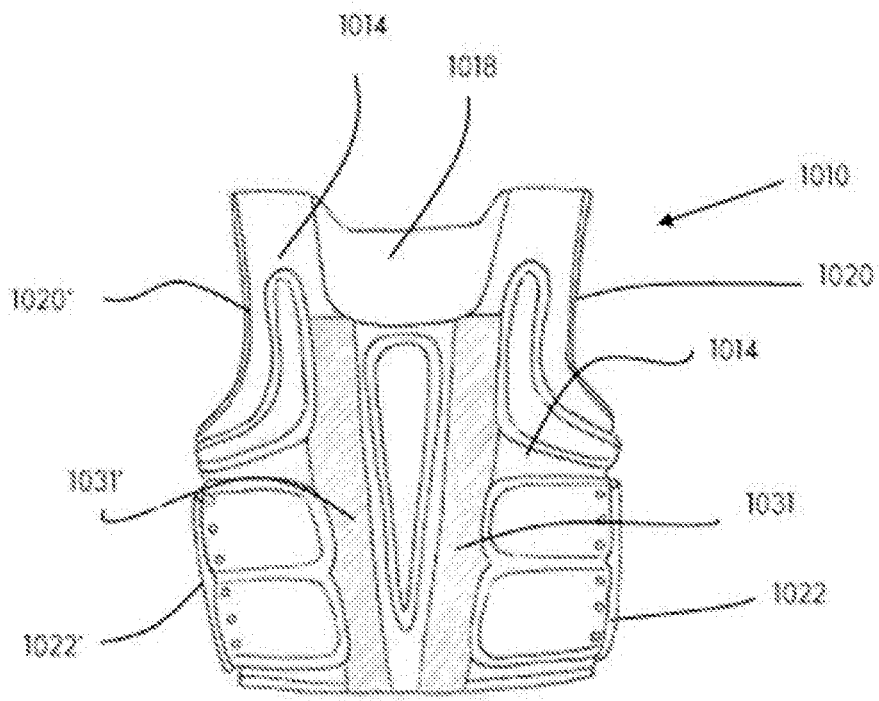
FIG. 8 is an embodiment of a front view of a football training vest in accordance with the principles of the present invention.
Figure 9:
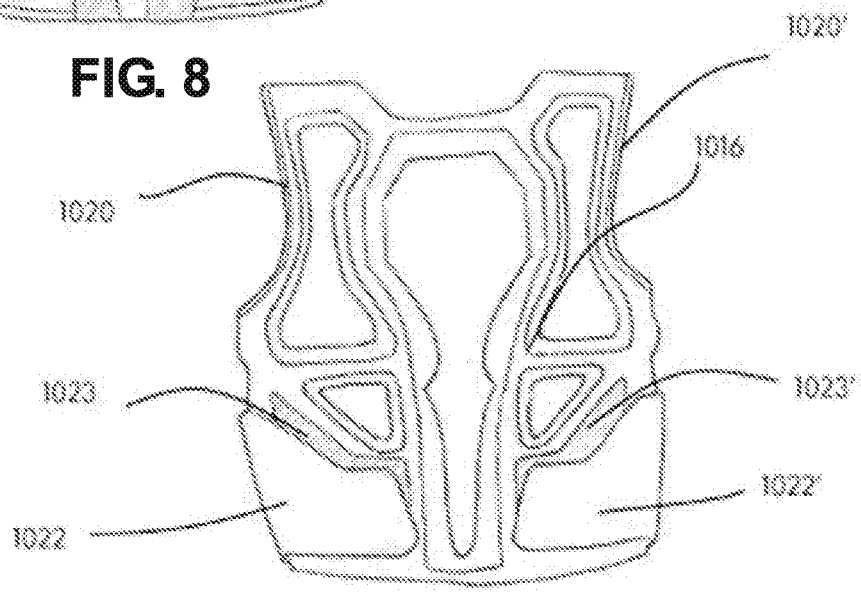
FIG. 9 is an embodiment of a rear view of a football training view in accordance with the principles of the present invention.

Referring now to an embodiment shown in FIG. 7, a football shoulder pads 300 is shown having a front portion 302. The front portion removably receives a corrective member 328. The corrective member 328 removably affixed with the shoulder pads 300 via a securement member within the spirit and scope of the instant invention. The corrective member 328 extends out from the shoulder pads 300 substantially perpendicular to the shoulder pads 300. The corrective member 328 may optionally extend through an aperture in a jersey (not shown) that covers the shoulder pads 300. The corrective member 328 is useful for teaching a quarterback the proper transition from a neutral position to a loaded ball position before release of the football during a football pass without dropping the hand and arm down causing a long windup and presenting the opportunity for a football defender to strip the football from the hand of the quarterback.

Referring now to FIGS. 8-15, football training device 1010 has a wearable portion, the wearable portion includes a front portion 1014 and a back portion 1016 that are joined to form a neck opening 1018 and mirrored left and right arm openings 1020, 1020'. In an embodiment, the wearable portion includes left and right flaps 1022, 1022' having hook and loop material thereof (not shown). The left and right flaps 1022, 1022' releasably secure on its hook and loop material with back portion 1016 via hook and loop material 1023, 1023' that reciprocates having a portion of the hook and loop material integrated with the back portion 1016 to provide an adjustable and secure fit of the vest with the quarterback. In an embodiment, the left and right flaps 1022, 1022' secure to the back portion 1016*d* by way of inserting the flaps 1022, 1022' through apertures 1025, 1025' created by members 1027, 1027', folding the flaps 1022, 1022' over and around the members 1027, 1027' and securing the flaps 1022, 1022' against the hook and loop material at elements 1023, 1023'. While hook and loop material is disclosed, alternative securement members may be implemented without departing from the spirit and scope of the present embodiment. Members 1027, 1027' secured along the sides 1071, 1071' of the wearable portion.

One or more hook and loop portions 1031, 1031' are integrated with the front portion 1014 for receiving a corrective member 1028. The corrective member 1028 has hook and loop material 1033 at a proximal end 1038 for reciprocal affixing against any of elements 1031, 1031', 1035, 1035'. In the embodiment shown in FIG. 8, the hook and loop material 1031, 1031' extends vertically and at an angle along the front portion 1014 of the football training device 1010, converging towards a bottom portion thereof.

The corrective member 1028 may be removably affixed at different levels along the front portion 1014. In addition to the reciprocating hook and loop material 1031, 1031', 1035, 1035', reciprocating hook and loop material may be placed at any point about the front portion 1014 for receiving the corrective member 1028. Other attachment members may be optionally implemented and placed at any point about the front portion 1014 for receiving the corrective member 1028.

In an embodiment, the one or more corrective members 1028 may be secured along hook and loop material along element 1031, 1031' or may be secured at portions at or near the side of the front portion 1014. In one embodiment, one, two, or more corrective members 1028 are removably affixed on the side of the front portion 1014 that relates to the throwing hand of the quarterback (being either left or right handed) for alerting the quarterback that their hand drops during the transition from a neutral position to a loaded football position.

The corrective member 1028 is formed of an elongated tubular portion for extending from the front portion 1014 and away from the quarterbacks front side of his body.

In an embodiment, the corrective member 1028 is bendable allowing for deformation when contact therewith is caused by the quarterback's arm or hand. The elongated tubular portion 1028 is configured to resume its original shape when force caused to be received by the quarterback is removed therefrom.

In an embodiment, the corrective member 1028 may also be configured to release from the football training device 1010 when the quarterback causes contact with the corrective member 1028. In operation, when the corrective member 1028 receives a sufficient force, the corrective member 1028 will release and fall to the ground, requiring the quarterback, or any other person, to pick up the corrective member 1028 and replace the corrective member 1028 by re-affixing the corrective member 1028 to the front portion 1014.

Still referring to the embodiment shown in FIGS. 8-15, the corrective member 1028 affixed at proximal end 1038 to the wearable portion and extends outwardly from the wearable portion and of the quarterback's torso. In operation, the corrective member 1028 extends outwardly from the front portion 1014. The corrective member 1028 is configured to receive contact from a quarterback when the quarterback transitions from a ball neutral position to a loaded football position.

Referring now to FIGS. 16-17, a quarterback 1050 is shown wearing the football training device 1010. The quarterback having left and right shoulders 1052 as is commonly understood. The corrective member 1028 extending outwardly from a breast plate of the wearable portion between the shoulders 1052 of the quarterback 1050. In operation, the corrective members extend outwardly to allow the quarterback to hold the football in a neutral position with the throwing elbow at or near the quarterback's side. Furthermore, the corrective members 1028 are positioned between the elbows of the quarterback so as to not affect the proper and natural throwing motion of the football. The position of the corrective member(s) 1028 should not impede or otherwise affect the throwing motion of the quarterback.

Figure 18:
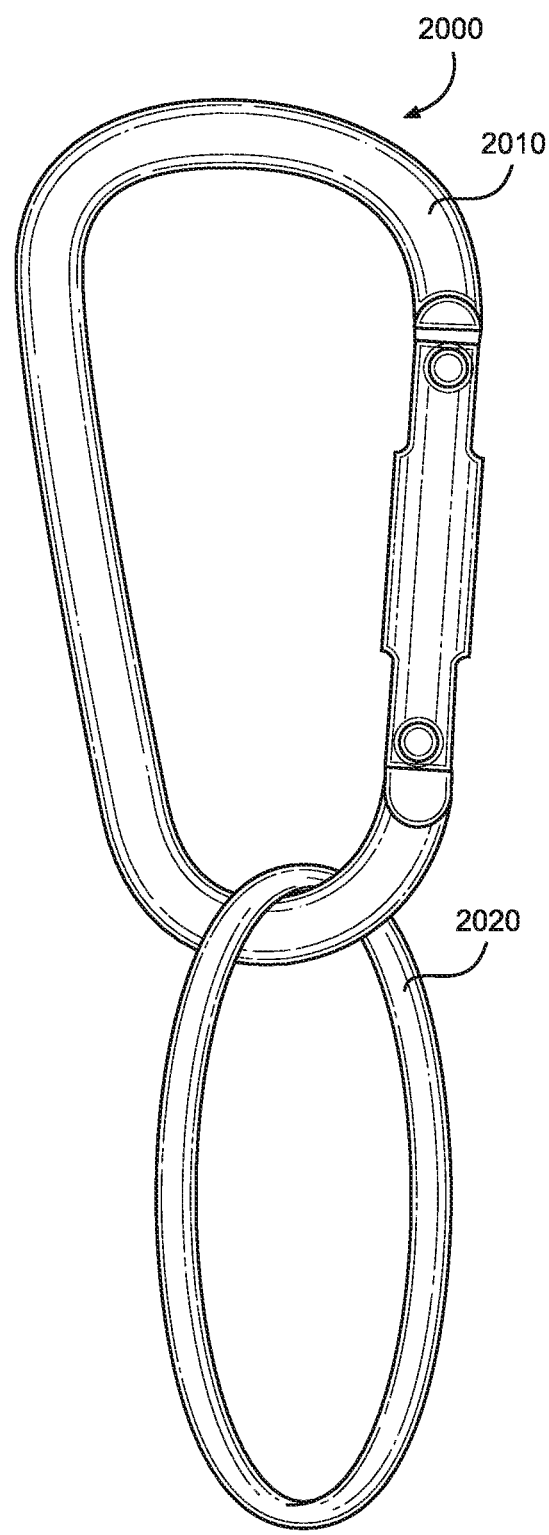
FIG. 18 is a plan view of a restraining device for use with the football training device according to an embodiment of the disclosure.
Figure 19:
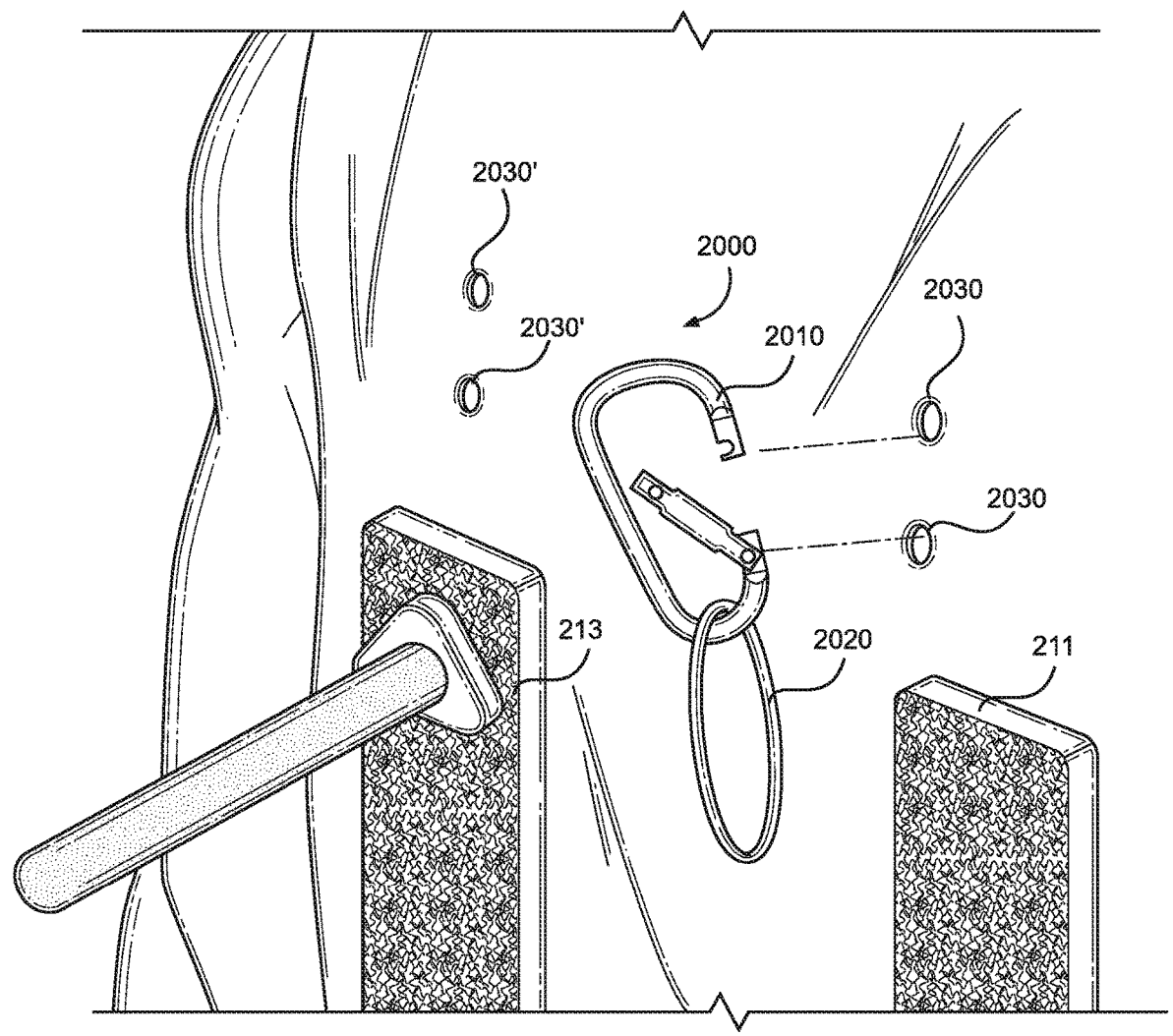
FIG. 19 is a view of the restraining device of FIG. 18 being attached to the football training device of the disclosure.
Figure 20:
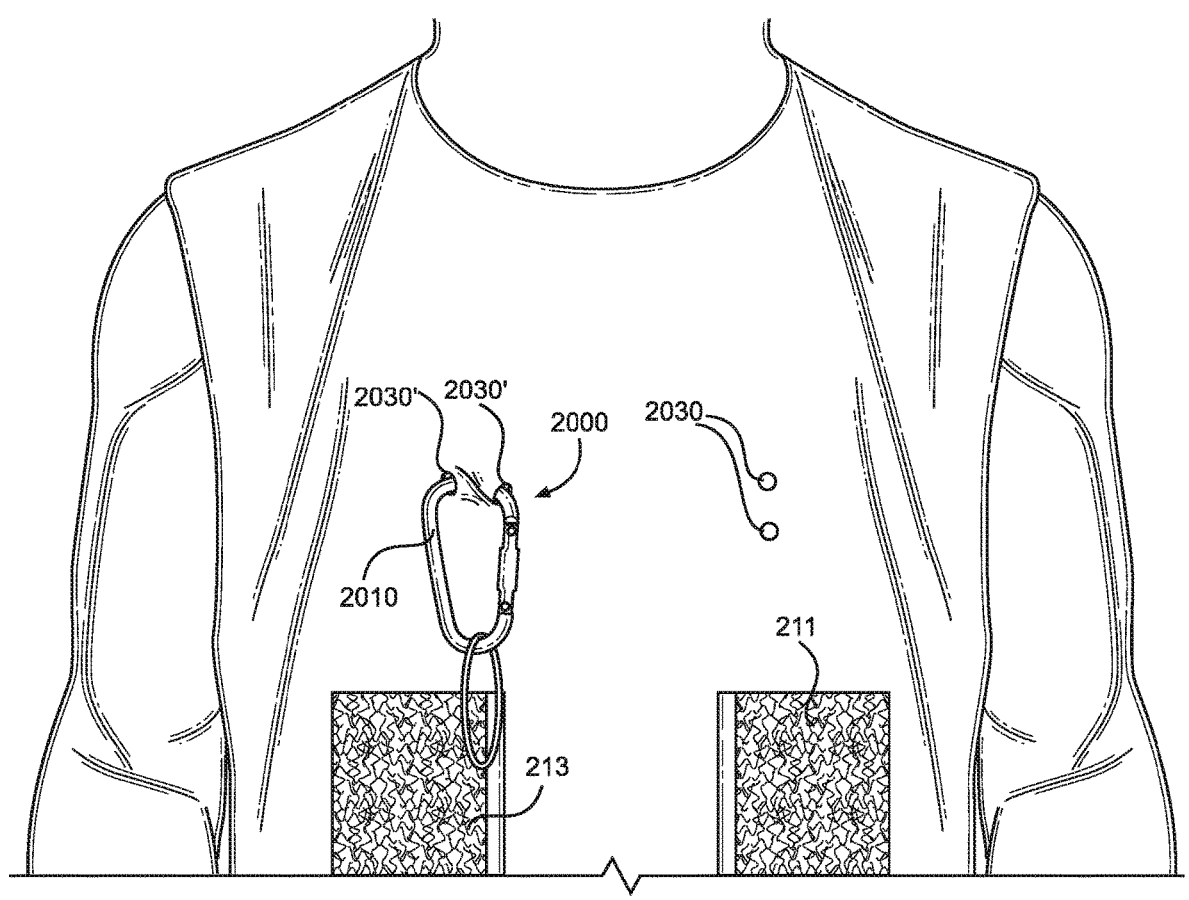
FIG. 20 is front view of a user having the restraining device of FIG. 18 attached to one side of the football training device of the disclosure.
Figure 22:
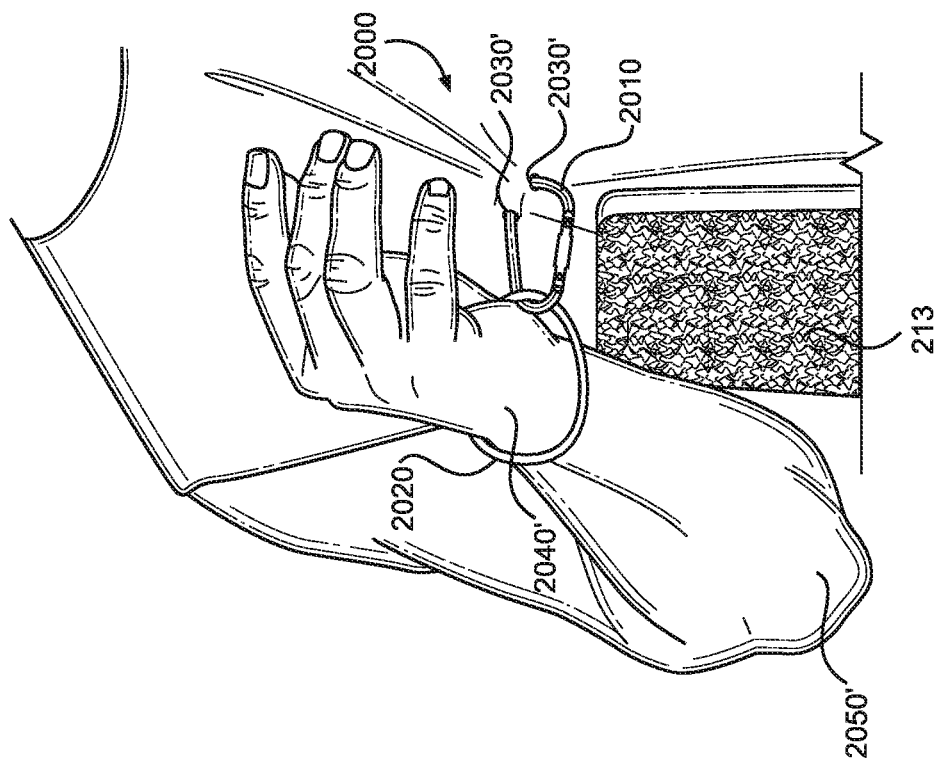
FIGS. 21 and 22 are front perspective views of the use of the restraining device of FIG. 18 for a right-handed and left-handed user according to the disclosure.
Figure 21:
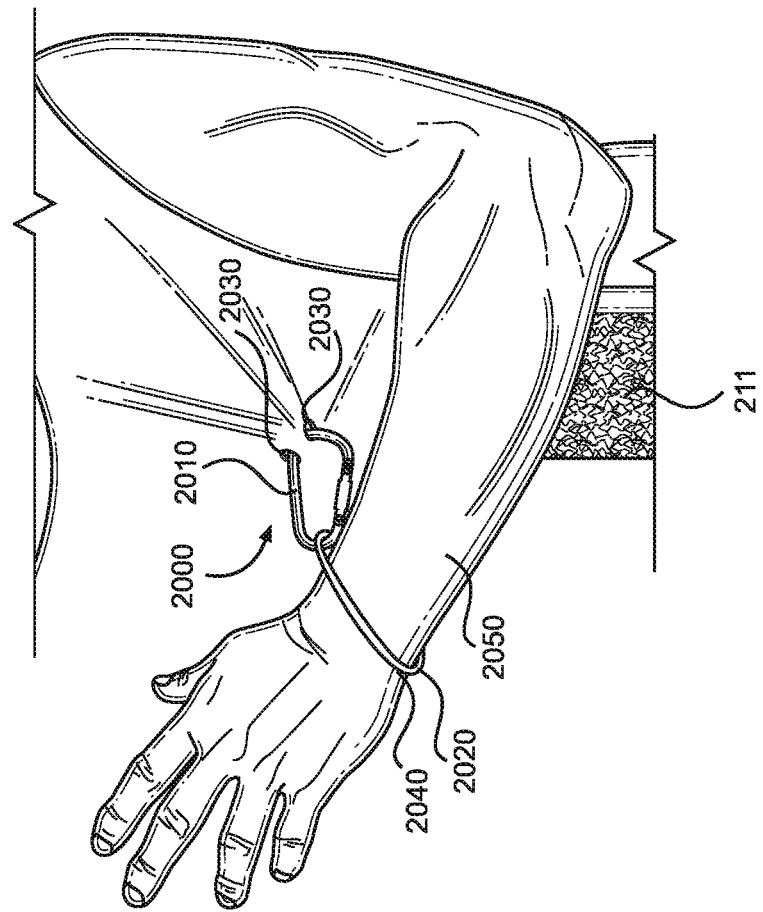
Figure 24:
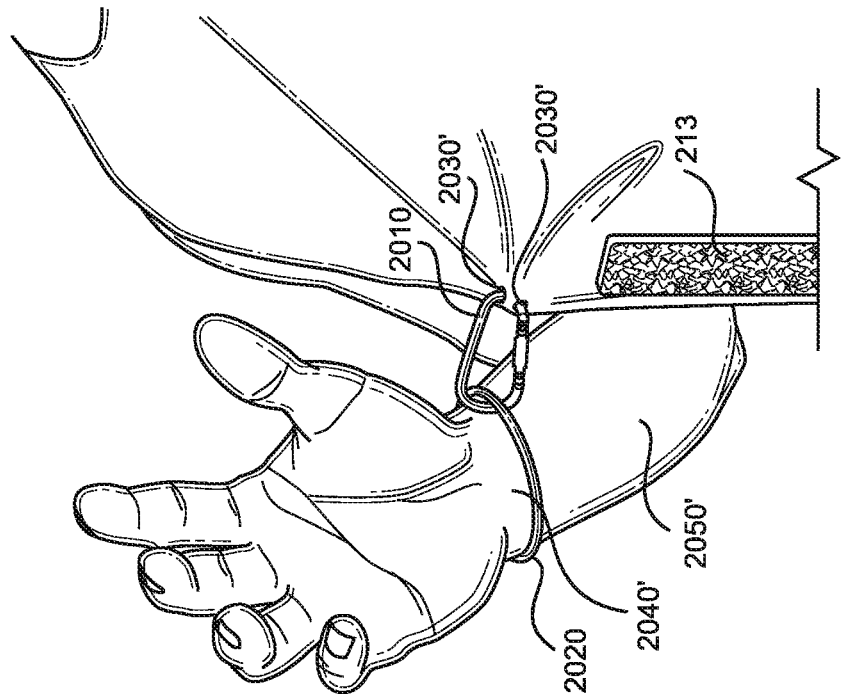
FIGS. 23 and 24 are side perspective views of the use of the restraining device of FIG. 18 for a right-handed and left-handed user according to the disclosure.
Figure 23:
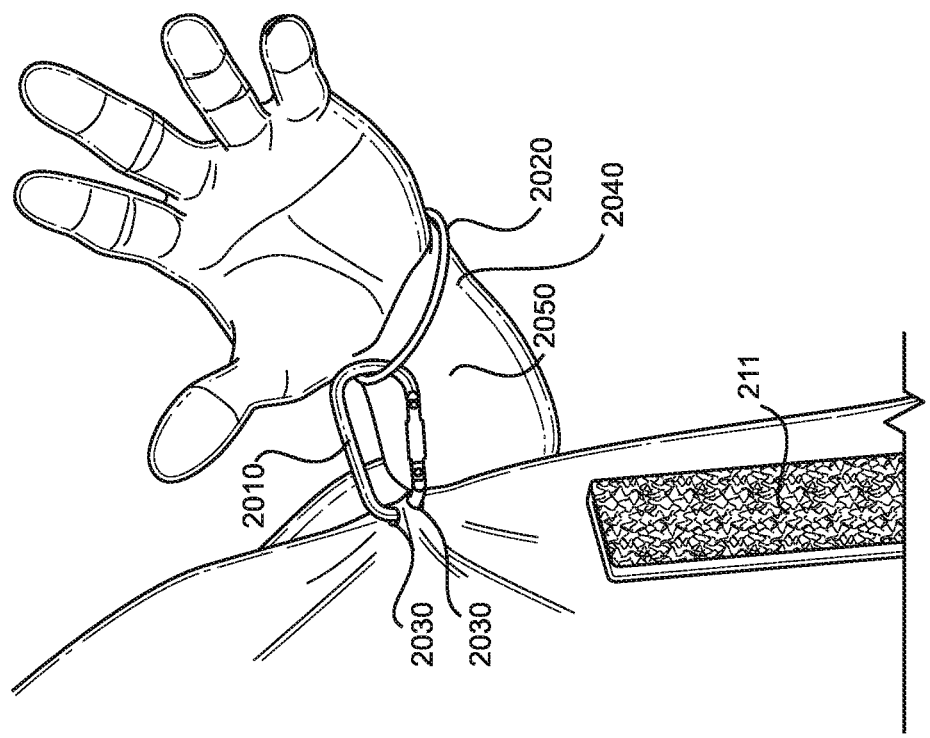

While the foregoing description of the training device provides an method for training the quarterback with regard to the motion of the throwing arm of the quarterback, there is also a need for a device to restrain the movement of the non-throwing arm of the quarterback. It is believed that excessive motion of the non-throwing arm of the quarterback can significantly reduce the accuracy of the throws by the quarterback. Accordingly, FIG. 18 illustrates a restraining device 2000 that may be removably attached to the above described vest for restraining the movement of the non-throwing arm and hand of the user. The restraining device 2000 includes a spring clip 2010 and a resilient band 2020 for removably attaching the restraining device 2000 to apertures 2030, 2030' (FIGS. 19 and 20) in the football training device 10, 1010, vests 100, 200, or shoulder pads 300 described above. Apertures 2030 in the training device 10, 1010, vests 100, 200, or shoulder pads 30 are located on an upper frontal portion thereof for use in attaching the restraining device 2000 thereto. Apertures 2030 are used to restrain the left hand and arm of a right-handed quarterback and apertures 2030' are used to restrain the right hand and arm of a left-handed quarterback.

FIGS. 21-28 illustrate how the restraining device 2000 is used to urge the non-throwing hand and arm of a quarterback toward the breast plate, vest, or upper frontal portion of the football training device during a throwing motion of a football. As shown in the drawings, the resilient band is positioned around a wrist 2040, 2040' on the non-throwing arm 2050, 2050' of the quarterback.

Figure 25:
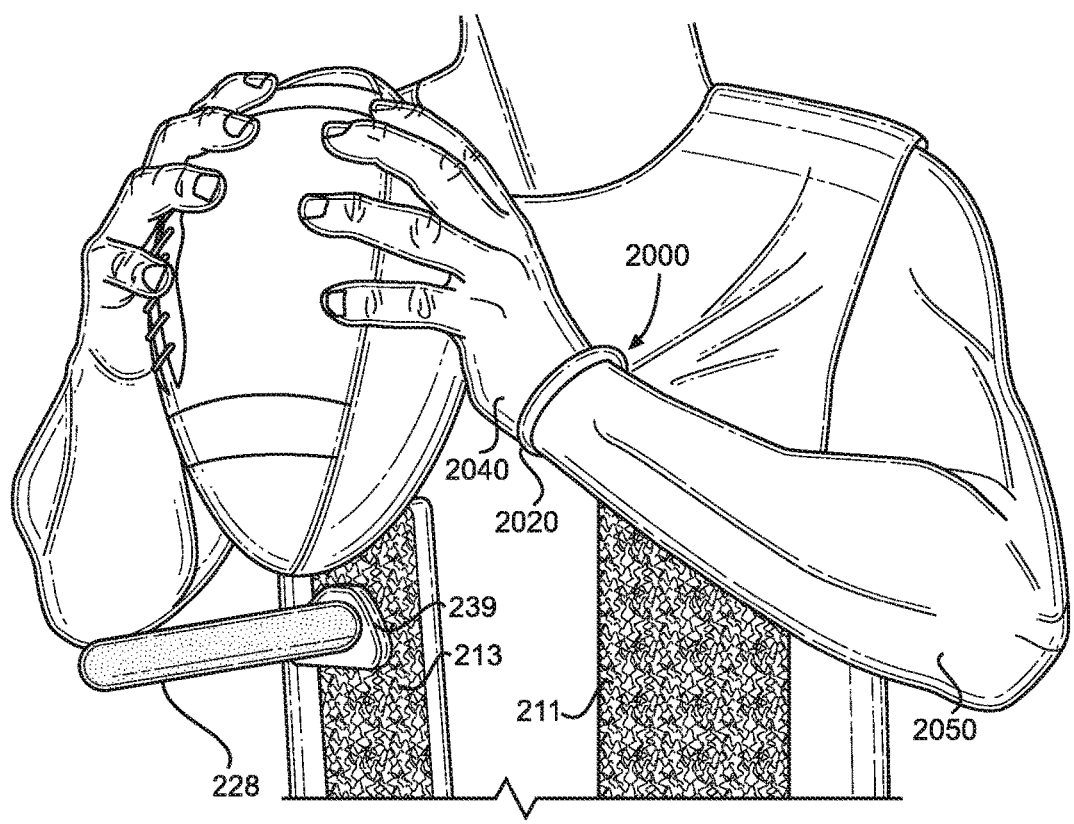
FIGS. 25 and 26 are front perspective views of the use of the restraining device of FIG. 18 for a right-handed and left-handed user while preparing to throw a football according to the disclosure.
Figure 26:
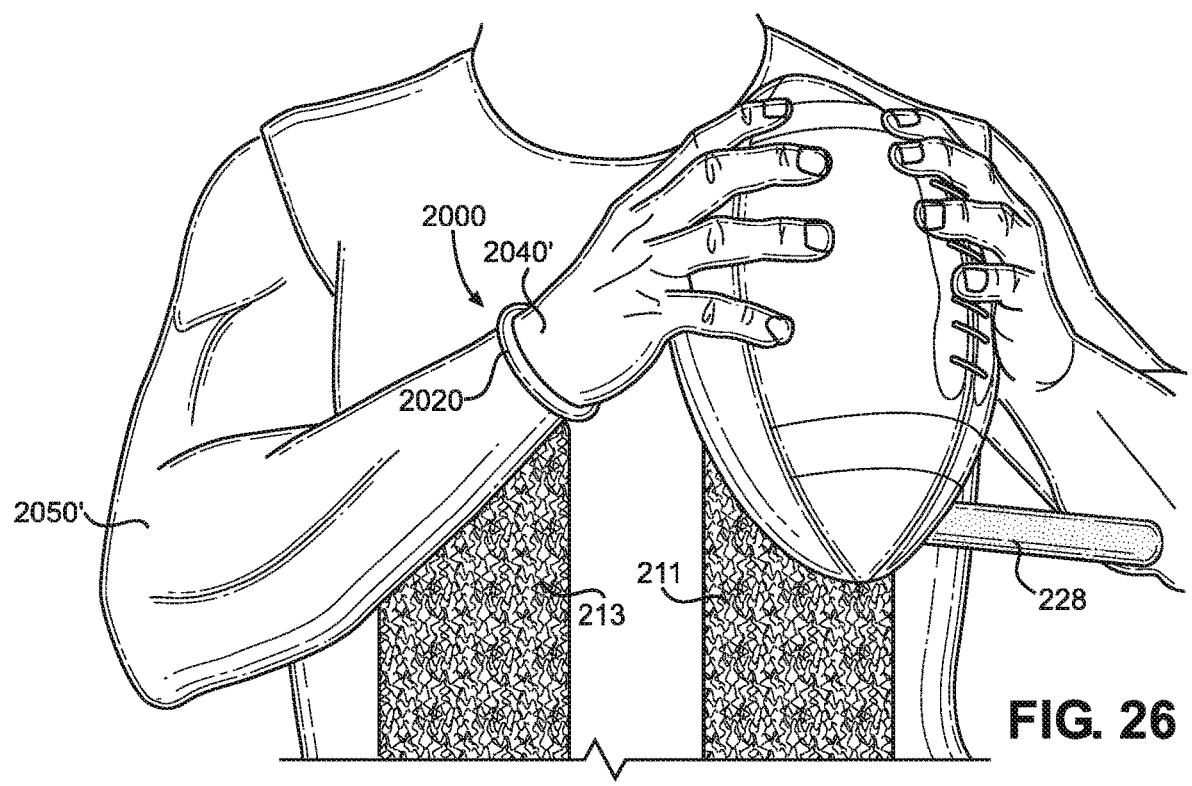
Figure 28:
FIGS. 27 and 28 are side perspective views of a right-hand and a left-hand user showing the use of the restraining device of FIG. 18 to restrain the non-throwing hand and arm of the user.
Figure 27:
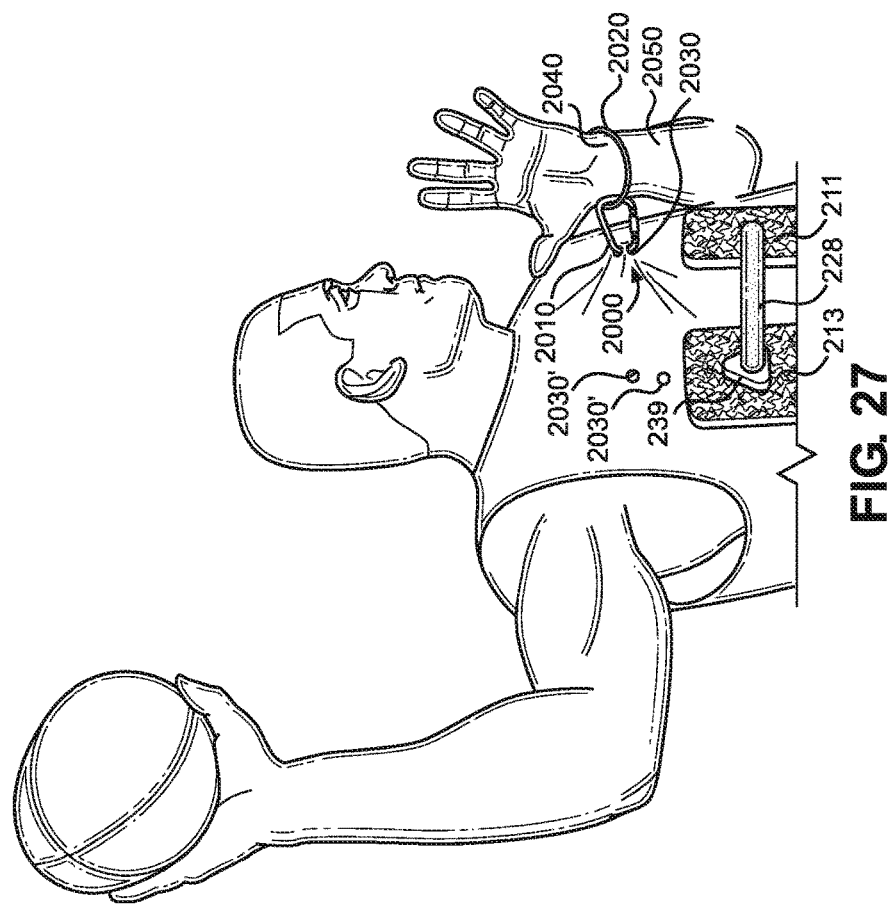
Figure 29:
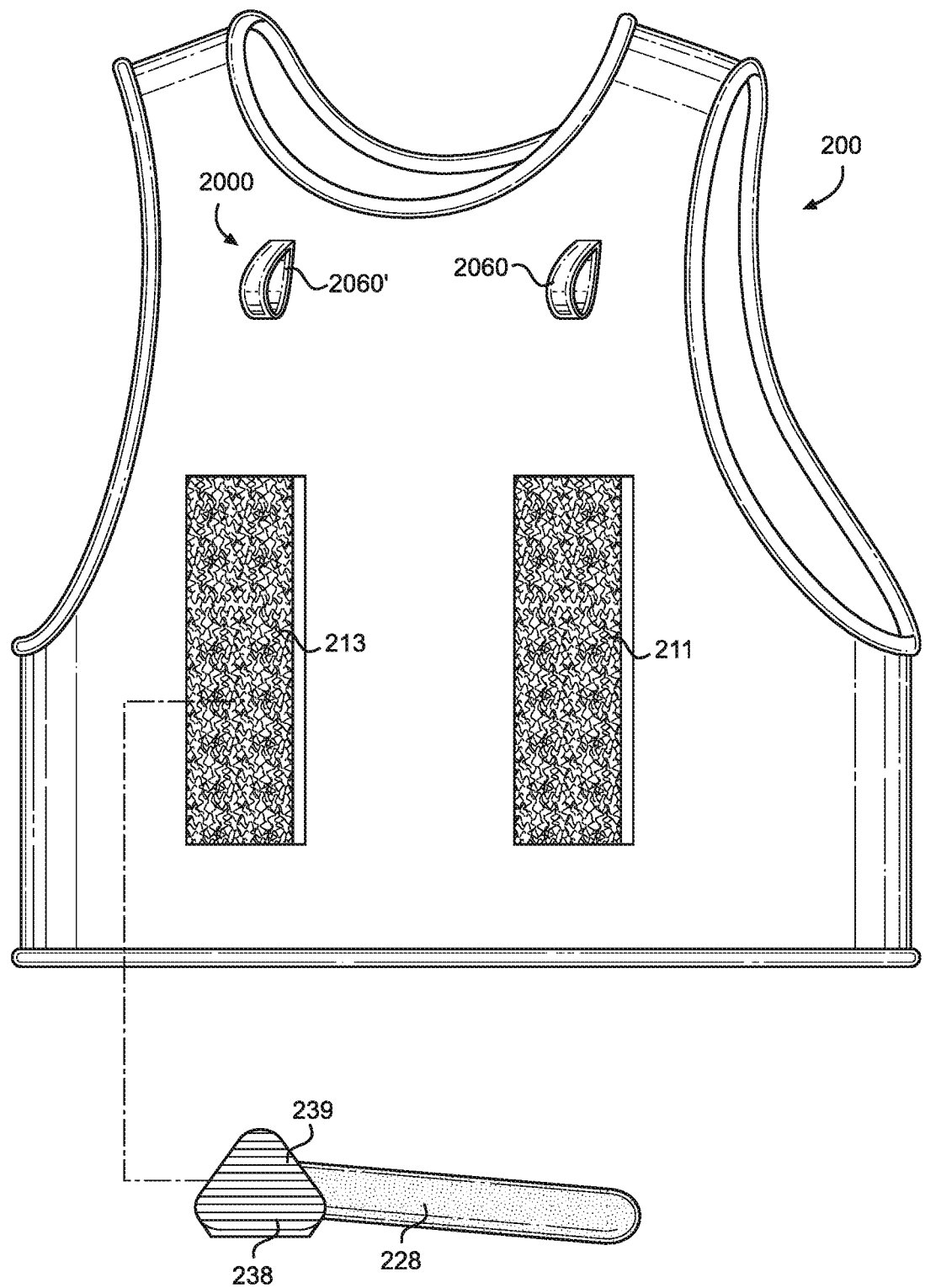
FIG. 29 is a front perspective view of a football training device containing another method of attaching a restraining device of FIG. 18 to the football training device according to the disclosure.

In FIGS. 25-26, the restraining device is shown on the non-throwing arm of a quarterback having a football in the loaded position for throwing. FIGS. 27 and 28 illustrate how the restraining device urges the arm 2050, 2050' and hand of the quarterback toward the breast plate of the football training device so that the non-throwing arm 2050, 2050' does not extend away from the body as the football is thrown.

In another embodiment, fabric loops 2060 and 2060' may be attached to the vest 200 or other football training device described above rather than apertures 2030, 2030' in the devices to provide for removable attachment of the restraining device 2000 to the vest. It will be appreciated that other types of attachment mechanisms may be used to removably attached the restraining device 2000 to the vests and wearable devices described herein.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are contemplated in light of the above teachings without departing from the scope and spirit of the invention. It will be readily apparent that various changes may be made thereto without departing from the spirit and scope of the disclosure or sacrificing all of its material advantages. The examples and embodiments described herein are merely exemplary of the instant disclosure. Various elements from the various embodiments disclosed herein may be combined together to arrive at the present invention.

What is claimed is:

1. A football training device comprising:
    a wearable vest having a breast plate;
    at least one deformable corrective member, the at least one deformable corrective member comprising an elongate tubular-shaped member having a proximal end and a distal end, the proximal end being attached to breast plate and the elongate tubular-shaped member extending outwardly substantially perpendicular to the breast plate of the vest, wherein the elongate tubular-shaped member is positioned on the breast plate on a side of the breast plate that relates to the throwing hand of a user and is positioned at a height on the breast plate that alerts a user of a low football takeaway from a neutral position to a loaded football ball position; and
    a restraining device removably attached to the vest, wherein the restraining device is positioned on a side of the vest that relates to the non-throwing hand of the user to urge the non-throwing hand and arm of the user to remain close to the breast plate during a throwing motion of the throwing hand.

2. The football training device of claim 1, wherein the proximal end of the elongate tubular-shaped member is releasably attached to the breast plate of the vest.

3. The football training device of claim 2, wherein the elongate tubular-shaped member is configured to release from the breast plate upon contact of the elongate tubular-shaped member with an arm of a user.

4. The football training device of claim 2, further comprising one or more breast plate hook and loop material(s) integrated with the breast plate of the vest, and corrective member hook and loop material integrated with the proximal end of the elongate tubular-shaped member, wherein the corrective member hook and loop material is releasably affixed to at least one of the one or more breast plate hook and loop material(s).

5. The football training device of claim 4, wherein the breast plate of the vest comprises multiple breast plate hook and loop materials, and wherein the elongate tubular-shaped member is repositionable on the breast plate hook and loop materials.

6. The football training device of claim 4, wherein the one or more breast plate hook and loop materials comprise an elongate substantially vertical strip of hook and loop material on a right half of the breast plate of the vest and an elongate substantially vertical strip of hook and loop material on a left half of the breast plate of the vest.

7. The football training device of claim 1, wherein the elongate tubular-shaped member further comprises at least one device configured to provide at least one of a visual and an audial alert upon contact of the elongate tubular-shaped member with an arm of a user.

8. The football training device of claim 1, wherein the elongate tubular-shaped member further comprises a signal transmission apparatus configured to transmit a signal to a remote device upon contact of the elongate tubular-shaped member with an arm of the user.

9. The football training device of claim 1, wherein the restraining device comprises a spring clip and an elastic band for the wrist of the user attached to the spring clip.

10. The football training device of claim 9, wherein the vest further comprises a pair of holes on each frontal side of the breast plate for removably attaching the spring clip to the vest.

11. The football training device of claim 9, wherein the vest further comprises a fabric loop on each frontal side of the breast plate for removably attaching the spring clip to the vest.

12. A football training device for improving a ball takeaway of a quarterback to a loaded football ball position, the football training device comprising:
    a wearable vest having a breast plate adjacent to a chest of the quarterback;
    a corrective member, each corrective member consisting essentially of an elongate tubular-shaped member having a proximal end releasably attached to the breast plate of the vest so that the elongate tubular-shaped member extends substantially perpendicular from the breast plate of the vest, wherein the elongate tubular-shaped member is configured to release from the breast plate upon contact of the elongate tubular-shaped member with an arm of a user during a throwing motion, wherein the elongate tubular-shaped member is positioned on the breast plate on a side of the breast plate that relates to the throwing hand of a user at a height on the breast plate that alerts the user of a low football takeaway from a neutral position to the loaded football ball position; and
    a restraining device removably attached to the vest, wherein the restraining device is positioned on a side of the vest that relates to the non-throwing hand of the user to urge the non-throwing hand and arm of the user to remain close to the breast plate during a throwing motion of the throwing hand.

13. The football training device of claim 12, wherein the elongate tubular-shaped member has a substantially circular cross-section.

14. The football training device of claim 12, wherein the elongate tubular-shaped member has a substantially rectangular cross-section.

15. The football training device of claim 12, wherein the restraining device comprises a spring clip and an elastic band for the wrist of the user attached to the spring clip.

16. The football training device of claim 15, wherein the vest further comprises a pair of holes on each frontal side of the breast plate for removably attaching the spring clip to the vest.

17. The football training device of claim 15, wherein the vest further comprises a fabric loop on each frontal side of the breast plate for removably attaching the spring clip to the vest.

18. A football training device for improving a ball takeaway of a quarterback to a loaded football ball position, the football training device comprising:
- a wearable vest having a breast plate adjacent to the chest of the quarterback;
- at least one deformable corrective member having a proximal end and a distal end, wherein the proximal end of the at least one deformable corrective member is releasably attached to the breast plate of the wearable vest, and the distal end of the at least one deformable corrective member extends perpendicularly away only from the breast plate of the wearable vest;
- wherein each deformable corrective member consists essentially of an elongate tubular-shaped member, wherein the elongate tubular-shaped member is positioned on the breast plate of the vest on a side of the breast plate that relates to the throwing hand of the quarterback at a height on the breast plate that alerts the quarterback of a low football takeaway for receiving contact with an arm of the quarterback during a quarterback football transition from the low football takeaway to the loaded football ball position; and
- a restraining device removably attached to the vest, wherein the restraining device is positioned on a side of the vest that relates to the non-throwing hand of the user to urge the non-throwing hand and arm of the user to remain close to the breast plate during a throwing motion of the throwing hand.

19. The football training device of claim 18, wherein the restraining device comprises a spring clip and an elastic band for the wrist of the user attached to the spring clip.

20. The football training device of claim 19, wherein the vest further comprises a pair of holes on each frontal side of the breast plate or a fabric loop on each frontal side of the breast plate for removably attaching the spring clip to the vest.

\* \* \* \* \*